United States Patent [19]

Suzuki

[11] Patent Number: 4,727,127
[45] Date of Patent: Feb. 23, 1988

[54] CURABLE ORGANOPOLYSILOXANE COMPOSITIONS

[75] Inventor: Toshio Suzuki, Chiba, Japan

[73] Assignee: Toray Silicone Co., Ltd., Tokyo, Japan

[21] Appl. No.: 40,898

[22] Filed: Apr. 20, 1987

[30] Foreign Application Priority Data

May 22, 1986 [JP] Japan .................................. 61-118044

[51] Int. Cl.$^4$ ............................................... C08G 77/06
[52] U.S. Cl. ...................................... 528/18; 528/901; 528/34; 528/23
[58] Field of Search ....................... 528/901, 23, 18, 34

[56] References Cited

U.S. PATENT DOCUMENTS 4,507,437 3/1985 Kato et al. .............................. 528/23
4,617,344 10/1986 Tanaka et al. ......................... 528/23
4,657,978 4/1987 Wakabayashi et al. ................ 528/23

FOREIGN PATENT DOCUMENTS 2653499 10/1979 Fed. Rep. of Germany .
2935616 7/1980 Fed. Rep. of Germany .

Primary Examiner—Melvyn I. Marquis
Attorney, Agent, or Firm—Edward C. Elliott

[57] ABSTRACT

A room temperature-curable organopolysiloxane composition which bonds well to the substrate in contact with it during curing, without requiring a special adhesion promoter, comprises an organopolysiloxane having at least 2 hydroxy or hydrocarbonoxy groups bonded to silicon, optionally a silane of the formula $$(R^2O)_a SiR^3{}_{4-a}$$

and from 0.01 to 20 weight percent parts silyl ester of phosphoric acid in which the —OH groups of phosphoric acid are replaced by —OSiR$^4{}_3$ groups or silyl ester of polyphosphoric acid in which the —OH groups of polyphosphoric acid are replaced by —OSiR$^4{}_3$ groups, where R$^4$ is monovalent organic group.

10 Claims, No Drawings

CURABLE ORGANOPOLYSILOXANE COMPOSITIONS

BACKGROUND OF THE INVENTION

1. Field of the Invention

The present invention relates to room temperature-curable organopolysiloxane compositions.

2. Background Information

Numerous organopolysiloxane compositions which cure at room temperature have been proposed up to this time. Among those compositions which cure by means of a condensation reaction, alcohol-releasing types which cure with the generation of alcohol, acetic acid-releasing types which cure with the generation of acetic acid, ketone-releasing types which cure with the generating of ketone, and oxime-releasing types which cure with the generation of oxime have reached the level of commercial production. In many cases, a curing-reaction catalyst is added to these compositions, and, for example, alkyl titanates and organotin carboxylates are known as catalysts.

A problem associated with these prior catalysts is that a special adhesion promoter must be added when it is desired that the curable composition containing such a catalyst bond to the substrate in contact with it during curing. Also, the problem of slow curing arises in the case of catalysts such as alkyl titanates.

German Auslegeshrift No. 26 53 499, Aug. 30, 1979, relates to compositions which cure when exposed to moisture which comprise a diorganopolysiloxane having reactive terminal groups, a silicon compound having at least one nitrogen atom and at least three hydrolyzable groups per molecule, and at least one phosphoric acid ester.

German Offlegungsschrift No. 29 35 616, Mar. 13, 1980, relates to a process for curing an organoalkoxysilane compound characterized in that as catalyst at least one compound of the group consisting of a phosphite of the formula $(RO)_nP(OH)_{3-n}$ and a phosphate of the formula

is used, wherein R represents an alkyl group having from 1 to 4 carbon atoms and/or an aromatic group, and n represents a whole number of 1 or 2.

Accordingly, the present inventor examined various compositions in order to resolve these problems, and this invention was developed as a result.

SUMMARY OF THE INVENTION

A curable polyorganosiloxane composition containing a polyorganosiloxane having at least 2 $OR^1$ groups bonded to silicone in each molecule in which $R^1$ is hydrogen atom or a monovalent hydrocarbon group, an alkoxy silane, and a silyl ester of phosphoric acid or a silyl ester of polyphosphoric acid, forms a composition which cures at room temperature upon exposure to moisture, to give a cured material which bonds well to the substrate in contact with it during cure, without requiring a special adhesion promoter.

The object of the present invention is to provide a room temperature-curable organopolysiloxane composition which will bond well to the substrate in contact with it during curing, without requiring a special adhesion promoter. Also, it is to have a fast curing reaction.

DESCRIPTION OF THE INVENTION

This invention relates to a curable organopolysiloxane composition comprising a composition of (i) 100 weight parts organopolysiloxane having at least 2 —$OR^1$ groups bonded to silicon in each molecule where $R^1$ is hydrogen atom or monovalent hydrocarbon group, (ii) 0 to 50 weight parts silane with the formula.

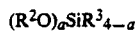

where $R^2$ is alkyl, alkenyl or alkoxyalkyl group, $R^3$ is monovalent organic group, a is from 2 to 4 inclusive, or its partial hydrolysis condensate, and (iii) 0.01 to 20 weight parts silyl ester of phosphoric acid in which the —OH groups of phosphoric acid are replaced by —O-$SiR^4_3$ groups or silyl ester of polyphosphoric acid in which the —OH groups of polyphosphoric acid are replaced by —$OSiR^4_3$ groups where $R^4$ is monovalent organic group.

By way of explanation, component (i) is the principal component of the composition of the present invention: it undergoes a curing reaction under the catalytic activity of component (iii), possibly in the presence of component (ii) as the crosslinker, to give the cured material. This component is to be an organopolysiloxane having at least two groups —$OR^1$ bonded to silicon in each molecule. $R^1$ is to be a hydrogen atom or monovalent hydrocarbon group. Said monovalent hydrocarbon group is exemplified by methyl, ethyl, propyl, isopropyl, butyl, phenyl, phenethyl, phenylisopropyl, allyl, isopropenyl and isobutenyl. The $R^1$ groups in the individual molecule may or may not be identical. $R^1$ is preferably the hydrogen atom or a lower alkyl group due to the corresponding higher curing reaction rate and the low cost of production. $OR^1$ may be present at any position in the molecule, but preferably at least two are present at the molecular terminals. This component may be linear, branch-containing straight chain, network or three dimensional, but a straight chain or a slightly branched straight chain is preferred. A polydiorganosiloxane is preferred when an elastomeric product is desired. While no restriction is placed on the molecular weight of this component, it preferably has a molecular weight corresponding to a viscosity equal to or less than 100 Pa.s at 25° C. from a consideration of the mixability with the other components.

Actual examples of this component are as follows: dimethylhydroxysiloxy-terminated polydimethylsiloxanes, methyldimethoxysiloxy-terminated polydimethylsiloxanes, methyldiethoxysiloxy-terminated polydimethylsiloxanes, trimethoxysiloxy-terminated polydimethylsiloxanes, dimethylhydroxysiloxy-terminated dimethylsiloxane-diphenylsiloxane copolymers, methyldimethoxysiloxy-terminated dimethylsiloxane-diphenylsiloxane copolymers, methyldiethoxysiloxy-terminated dimethylsiloxane-diphenylsiloxane copolymers, trimethoxysiloxy-terminated dimethylsiloxane-diphenylsiloxane copolymers, dimethylhydroxysiloxy-terminated dimethylsiloxane-methylphenylsiloxane copolymers, methyldimethoxysiloxy-terminated dimethylsiloxane-methylphenylsiloxane copolymers, methyldiethoxysiloxy-terminated dimethylsiloxane-methylphenylsiloxane copolymers, trimethoxysiloxy-terminated dimethylsiloxane-methylphenylsiloxane copolymers, dimethylhydroxysiloxy-terminated polymethyltrifluoropropylsiloxanes, dimethylhydroxysiloxy-terminated dimethylsiloxane-methyltrifluoropropylsiloxane copolymers, and the hydrolyzates of at least one species of silane selected from among methyltrimethoxysilane, dimethyldimethoxysiloxane, trimethylmethoxysilane and tetramethoxysilane. Preferred polysiloxane copolymers are those which contain at least 50 mol percent dimethylsiloxane units.

Component (ii) is a crosslinker for the composition of the present invention. This component is required when OH is the $OR^1$ in component (i), but it is not necessarily required in other cases. This component is a silane with the formula $(R^2O)_a SiR^3{}_{4-a}$ or the partial hydrolyzate thereof. The groups $R^2$ may or may not be identical to each other, and are alkyl, alkenyl or alkoxyalkyl groups. The groups $R^3$ may or may not be identical to each other, and are monovalent organic groups. a is from 2 to 4 inclusive. When this component takes the form of the partial hydrolyzate of silane with the above formula, hydrolysis must be conducted while regulating the quantity of water so $R^2O$ groups will remain. $R^2$ is exemplified by methyl, ethyl, propyl, isopropyl, butyl, isobutyl, allyl, isopropenyl, methoxyethyl and methoxypropyl. $R^3$ is exemplified by alkyl groups such as methyl, ethyl, propyl, isopropyl and butyl; alkenyl groups such as vinyl, allyl, isopropenyl and isobutenyl; phenyl; phenethyl; phenylisopropyl and trifluoropropyl. When an alkenyl group or the phenyl group is used as $R^3$ instead of alkyl, the curing reaction tends to proceed rapidly. a is from 2 to 4 inclusive because the curing reaction will not proceed well when a is less than 2. a is preferably 3 or 4. This component is to be added at 0 to 50 weight parts per 100 weight parts component (i). This is because curing becomes slow at greater than 50 weight parts and the mechanical properties of the cured product are adversely affected. While an addition within the range of 1 to 10 weight parts is in general preferred, the optimal quantity may not always fall within the range of 1 to 10 weight parts because it will vary with the character of component (i) and the amount of water present in the composition. Thus, in the presence of a sufficient quantity of silicon-bonded $OR^1$, when $R^1$ is other than hydrogen, in component (i), the quantity of this component may be much less than 1 weight part, or may even be zero. When component (i) contains substantial silicon-bonded OH, this component is preferably present at 10 or greater weight parts in some cases. On the other hand, when a large quantity of water is present in the composition due to the effect of the filler, this component will be hydrolyzed by the water and greater than 10 weight parts of this component must be added in some cases in order to obtain an effective quantity of this component.

Component (iii) characterizes the composition of the present invention, and it acts as a catalyst in the crosslinking of the composition by the reaction of component (i) and component (ii), while also acting to promote good bonding between the composition and the substrate in contact with it during curing. This component consists of the silyl esters of phosphoric acid in which the —OH groups of phosphoric acid are replaced by —$OSiR^4{}_3$ groups and the silyl esters of polyphosphoric acid in which the —OH groups in polyphosphoric acid are replaced by —$OSiR^4{}_3$ groups. In the formula, the groups $R^4$, which may nor may not be identical to each other, are to be monovalent organic groups. Concrete examples of the phosphoric and polyphosphoric acids specified herein are orthophosphoric acid, pyrophosphoric acid, metaphosphoric acid, tripolyphosphoric acid, tetrapolyphosphoric acid and the condensate of metaphosphoric acid-polymetaphosphoric acid. While the silyl esters of phosphoric acid and polyphosphoric acid are effective in the present invention as component (iii) regardless of the species of phosphoric acid or the molecular weight of the polyphosphoric acid, the silyl esters of orthophosphoric acid are preferably used because they have low viscosities and so are easily handled, they have good compatibility with the other components, and they have a mild reactivity.

Also, exceeding six phosphoric acid atoms in a single molecule is undesirable because the resulting high viscosity makes handling difficult. The groups $R^4$, which are to be monovalent organic groups, are exemplified by alkyl groups such as methyl, ethyl, propyl, isopropyl, butyl and isobutyl; cycloalkyl groups such as cyclopentyl and cyclohexyl; alkenyl groups such as vinyl, allyl and isopropenyl; and aryl groups such as phenyl, tolyl, xylyl and naphthyl. Alkoxy groups may comprise a small amount of $R^4$. Also, a portion of $R^4$ may be replaced by the hydroxyl group or halogen. There is no specific restriction on the number of carbon atoms in $R^4$, but the number of carbon atoms is preferably 10 or less from the standpoints of reactivity and production costs. Moreover, preferably 60 percent of greater of $R^4$ is methyl from the standpoints of stability during phosphate ester synthesis, ease of purification of the phosphate ester, and low starting material costs.

The aforementioned component (iii) can be synthesized by known synthesis methods. A typical example, as reported in *Yuki Gosei Kagaku Kyokai-shi,* Volume 43, Number 12, page 1163 (1985), is to heat hexamethyldisiloxane with phosphorus pantoxide in benzene under reflux. In this example, replacing the starting phosphorus pentoxide with orthophosphoric acid affords the orthophosphate ester. Other silyl phosphate esters are easily produced by replacing the methyl group in the siloxane with another organic group.

The quantity of addition of this component is specified at 0.01 to 20 weight parts per 100 weight parts component (i). This is because curing is inadequate at below 0.01 weight part. Exceeding 20 weight parts is essentially meaningless and, furthermore, the quantity of liberated phosphoric acid or polyphosphoric acid becomes excessive, adversely affecting the physical properties of the cured material itself or any metals or plastics in the vicinity. Accordingly, the preferred quantity of addition falls within the range of 0.1 weight part to 5 weight parts.

The mechanism for the catalytic activity of this component remains unresolved, but is thought that an active phosphoric acid species is produced by scission of the SiOP bond by reaction with an active hydrogen-containing compound such as water or alcohol, and that this acts as a catalyst to promote the curing reaction.

In addition to components (i) through (iii), the following components may be added to the composition of the present invention unless this adversely affects the object of the present invention: dry-method silica, precipitated silica, natural silica, quartz powder, silica balloons, calcium carbonate, aluminum, alumina, carbon black, titanium oxide, iron oxide, mica, talc and these powders whose surfaces have been treated with silane, silazane, siloxane, fatty acids or fatty acid esters; silane coupling agents possessing the epoxy, methacryloxy, acryloxy or aminoalkyl group; organic and inorganic colorants; and flame retardants such s platinum compounds and hydrazines.

The curable composition of the present invention is produced by simply mixing components (i) through (iii) and any other components; any mixer known in the relevant art may be used for this mixing. Actual examples of the mixers are kneader mixers, planetary mixers and single-screw and double-screw extruders.

In general, the curable composition of the present invention will be used as a moisture-curing composition in which the curing reaction is initiated by means of atmospheric moisture. Accordingly, when the composition of the present invention is to be used in single-package form, that is, the so-called single-liquid form, care must be exercised to exclude moisture during mixing and packaging of the composition. In the case of a so-called two-liquid type, with division into two packages, it is recommended that component (iii) be packaged separately from the other components.

In the coating and bonding of the composition of the present invention on another substrate, dilution with organic solvent is permissible in order to reduce the viscosity of the composition.

EXAMPLES

The invention is illustrated using examples. Unless otherwise specified, "part" is "weight part" and "percent" is "weight percent". The various properties were measured at 25° C. unless otherwise specified.

EXAMPLE 1

Fifteen parts of orthophosphoric acid (90 percent aqueous solution) and 60 parts hexamethyldisiloxane were placed in a flask and this was heated under reflux at 110° C. while the water was removed via a water-separation tube. This was allowed to cool when the contents become homogeneous and transparent. The fraction boiling at 80° to 90° C. under 5 mmHg pressure (this fraction is designated as PSE-A) was collected by vacuum distillation. The PSE-A was confirmed to be the tris(trimethylsilyl) ester of orphophosphoric acid by NMR, gas chromatography and mass spectroscopy.

A mixture of 100 parts of a hydroxyl-terminated polydimethylsiloxane with a viscosity of 4 Pa.s, 1.5 parts of the partial hydrolyzate of ethyl silicate (60 percent ethoxy group content) and 1 part PSE-A was coated to a thickness of approximately 1 mm on glass and aluminum plates. The coated mixture was cured into a rubber after 12 hours, and bonded well to the glass and aluminum plates.

In a comparison example, a mixture was prepared using dibutyltin dilaurate in place of PSE-A. While this mixture similarly cured in 12 hours, it did not adhere to the glass or aluminum plates.

EXAMPLE 2

The fraction boiling at 115° to 125° C. under 5 mmHg pressure (designated as PSE-B) was collected in synthesis by the method described in Example 1 using 1,1,3,3-tetramethyldivinyldisiloxane instead of the hexamethyldisiloxane used in Example 1. The analytical results confirmed that PSE-B was the tris(dimethylvinylsilyl) ester of orthophosphoric acid.

A mixture of 100 parts of dimethoxymethylsiloxy-terminated polydimethylsiloxane with a viscosity of 12 Pa.s, 15 parts dry-metod silica (specific surface approximately 200 m²/g, surface treated with hexamethyldisilazane), and 0.5 parts PSE-B were mixed in a planetary mixer. This mixture was applied in a thickness of approximately 2 mm on glass and aluminum plates as in Example 1. The coated mixture was cured into a rubber after 12 hours, and bonded well to the glass plate although it does not bond to the aluminum plate.

In a comparison example, a mixture was prepared using tetrabutyl titanate in place of PSE-B. The mixture cured in 24 hours, but it did not bond to either the aluminum or glass plates.

EXAMPLE 3

Twenty parts of phosphorus pentoxide was placed in a flask equipped with a reflux condenser, 38 parts hexamethyldisiloxane and 80 parts benzene were added, and this was heated under reflux with stirring under an argon atmosphere for 1 hour. The resulting solution was concentrated on an evaporator to obtain the trimethylsilyl ester of polyphosphoric acid (PSE-C).

A mixture of 100 parts hydroxyl-terminated dimethylsiloxane-methylphenylsiloxane copolymer having a viscosity of about 0.8 Pa.s and a molar ratio of dimethylsiloxane to methylphenylsiloxane of 80:20, was thoroughly mixed with 8 parts vinyltrimethoxysilane and 1 part PSE-C. This mixture was applied in a thickness of approximately 1 mm on a quartz plate. The coated mixture was cured into a rubber after 1 hour, and it bonded well to the quartz plate.

In a comparison example, a mixture prepared using tin octylate in place of PSE-C similarly cured within 1 hour, but it absolutely did not adhere to the quartz plate.

EXAMPLE 4

A mixture of 100 parts trimethoxysiloxy-terminated polydimethylsiloxane, having a viscosity of about 6 Pa.s, 0.5 parts isopropyl silicate, and 0.8 parts of the PSE-A described in Example 1 was applied in a thickness of 1 mm on a glass fiber-reinforced polyester plate. The coated mixture was cured into a rubber after 12 hours, and bonded well to the polyester plate.

In a comparison example, a mixture prepared using tetrabutyl titanate in place of PSE-A similarly cured within 12 hours, but it did not adhere to the polyester plate.

That which is claimed is:

1. A curable organopolysiloxane composition comprising a composition of
   (i) 100 weight parts organopolysiloxane having at least 2 —OR¹ groups bonded to silicon in each molecule where $R^1$ is hydrogen atom or monovalent hydrocarbon group
   (ii) 0 to 50 weight parts silane with the formula

   $(R^2O)_a SiR^3_{4-a}$ where $R^2$ is alkyl, alkenyl or alkoxyalkyl group, $R^3$ is monovalent organic group, a is from 2 to 4 inclusive, or its partial hydrolysis condensate, and
   (iii) 0.01 to 20 weight parts silyl ester of phosphoric acid in which the —OH groups of phosphoric acid are replaced by —OSiR⁴₃ groups or silyl ester of polyphosphoric acid in which the —OH groups of polyphosphoric acid are replaced by —OSiR⁴₃ groups, where $R^4$ is monovalent organic group.

2. A curable organopolysiloxane composition comprising a composition of (i) 100 weight parts organopolysiloxane having at least 2 —OH groups bonded to silicon in each molecule,
(ii) 1 to 50 weight parts silane with the formula $(R^2O)_a SiR^3{}_{4-a}$ where $R^2$ is alkyl, alkenyl or alkoxyalkyl group, $R^3$ is monovalent organic group, a is from 2 to 4 inclusive, or its partial hydrolysis condensate, and
(iii) 0.01 to 20 weight parts ester of phosphoric acid in which the —OH groups of phosphoric acid are replaced by —OSiR$^4{}_3$ groups or silyl ester of polyphosphoric acid in which the —OH groups of polyphosphoric acid are replaced by —OSiR$^4{}_3$ groups, where $R^4$ is monovalent organic group.

3. A curable organopolysiloxane composition comprising a composition of
(i) 100 weight parts organopolysiloxane having at least 2 hydrocarbonoxy groups bonded to silicone in each molecule,
(ii) 0 to 5 weight parts silane with the formula $(R^2O)_a SiR^3{}_{4-a}$ where $R^2$ is alkyl, alkenyl or alkoxyalkyl group, $R^3$ is monovalent organic group, a is from 2 to 4 inclusive, or its partial hydrolysis condensate, and
(iii) 0.01 to 20 weight parts silyl ester of phosphoric acid in which the —OH groups of phosphoric acid are replaced by —OSiR$^4{}_3$ groups or silyl ester of polyphosphoric acid in which the —OH groups of polyphosphoric acid are replaced by —OSiR$^4{}_3$ groups, where $R^4$ is monovalent organic group.

4. The composition of claim 1 in which a is 3 or 4.
5. The composition of claim 2 in which a is 3 or 4.
6. The composition of claim 3 in which a is 3 or 4.
7. The composition of claim 4 in which (ii) is from 1 to 10 weight parts.
8. The composition of claim 5 in which (ii) is from 1 to 10 weight parts.
9. The composition of claim 7 in which (iii) is from 0.1 to 5 weight parts of silyl ester of phosphoric acid of the formula $(R^4{}_3SiO)_3P=O$ where $R^4$ is monovalent organic group of 10 or less carbon atoms.
10. The composition of claim 9 in which greater than 60 percent of $R^4$ is methyl group.